UNITED STATES PATENT OFFICE.

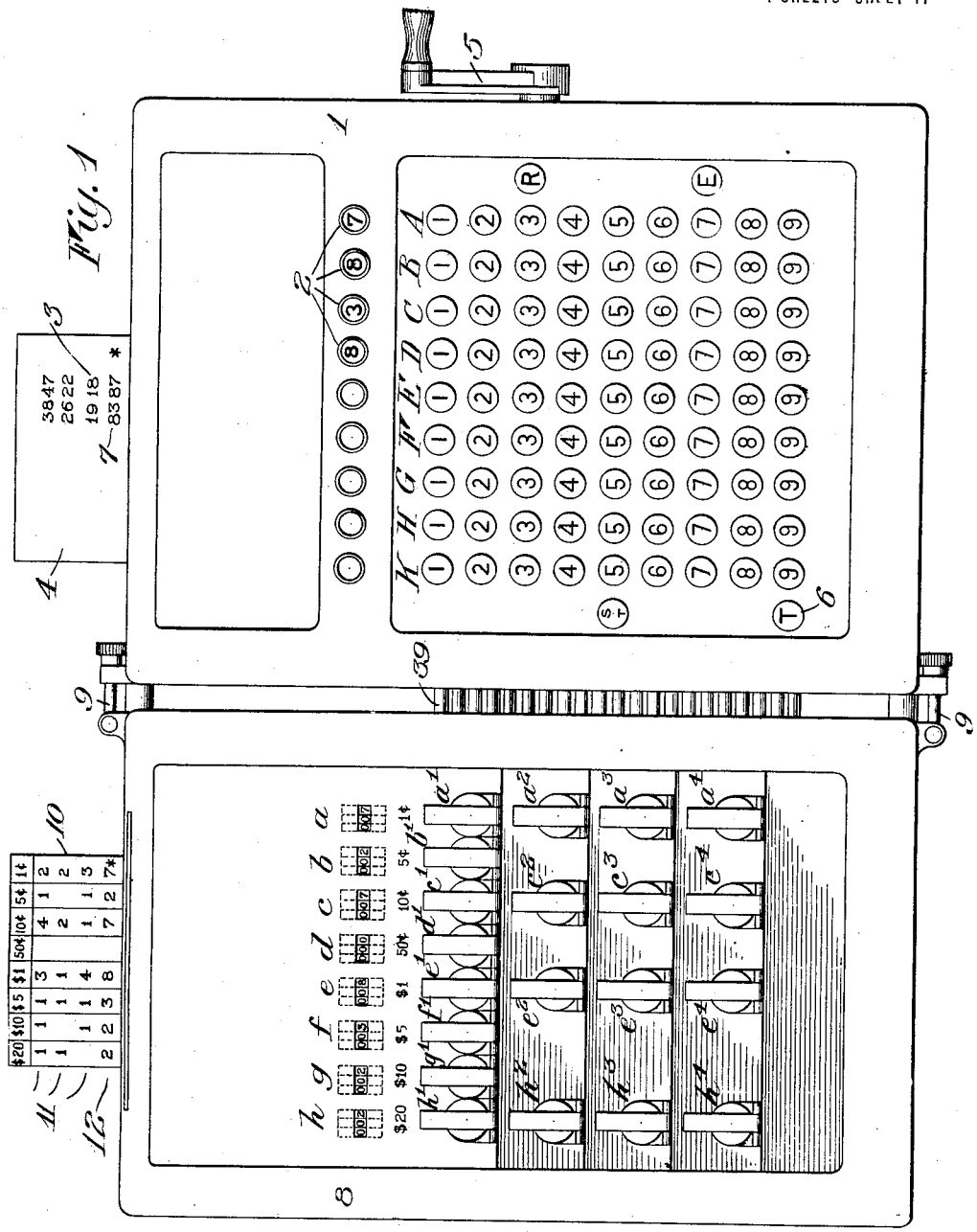

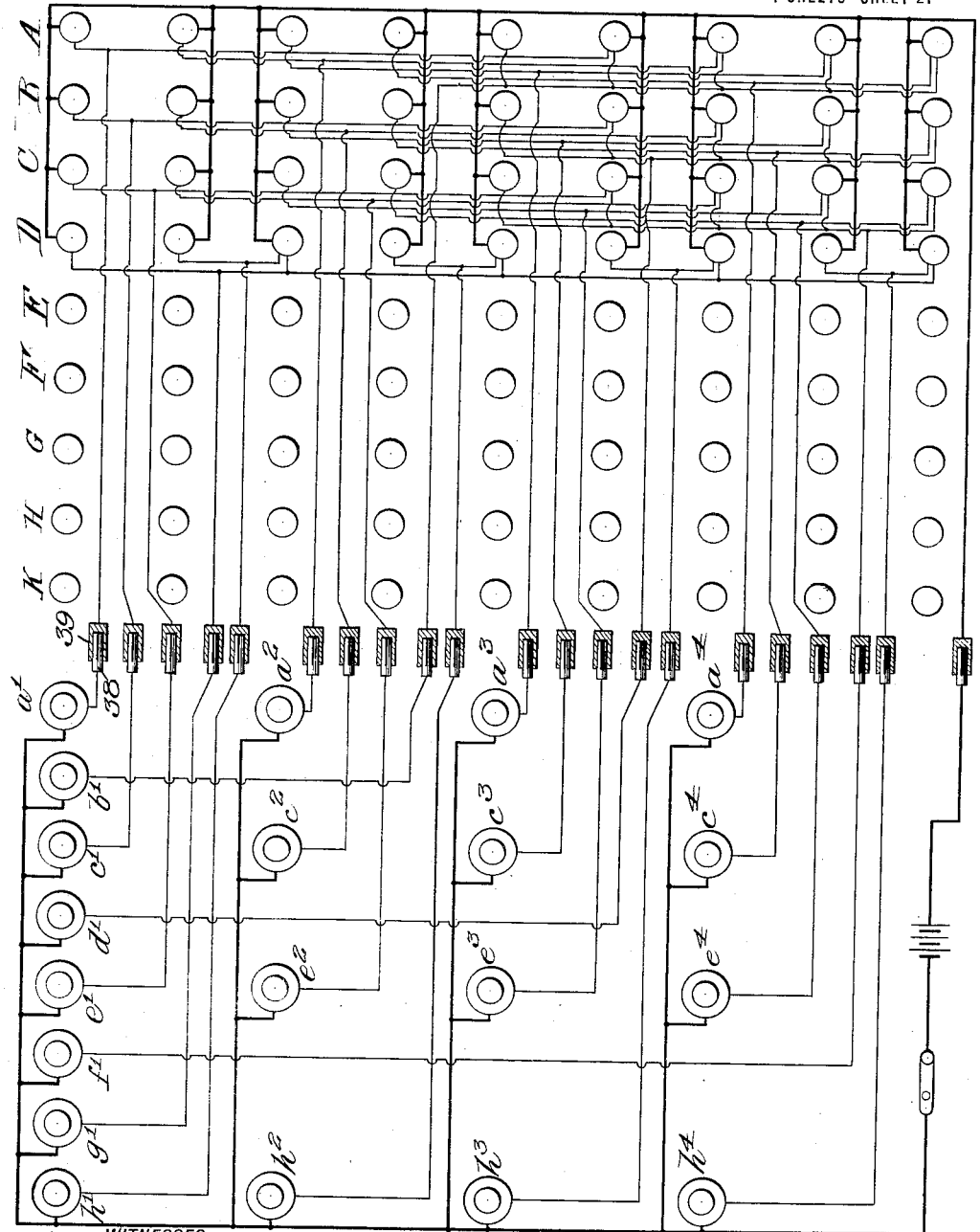

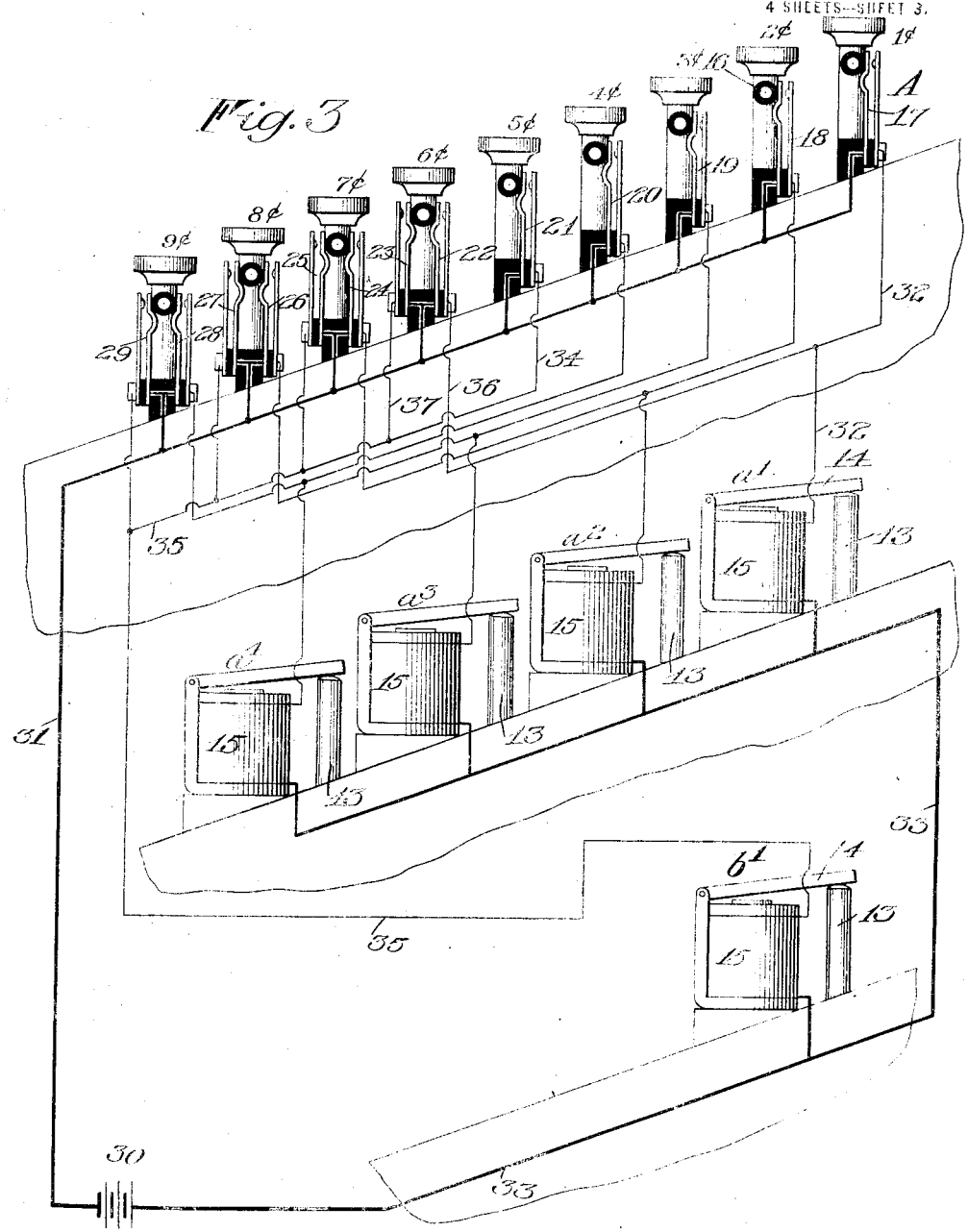

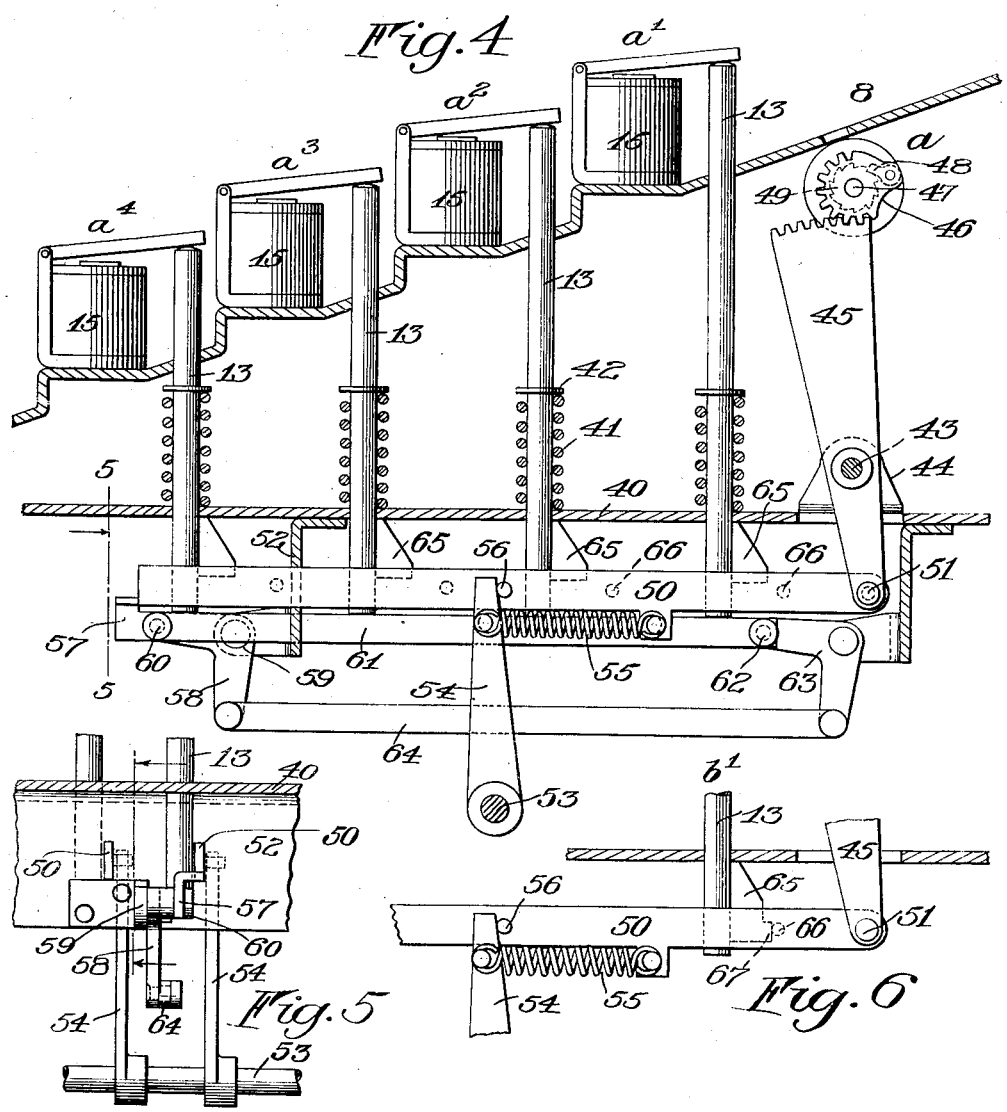

THEODORE D. WILLIAMS, OF ROCHESTER, NEW YORK, ASSIGNOR OF ONE-THIRD TO WILLIS A. MATSON, OF ROCHESTER, NEW YORK.

PAY-ROLL-CALCULATING MACHINE.

1,262,727.

Specification of Letters Patent.   Patented Apr. 16, 1918.

Application filed September 1, 1915.   Serial No. 48,440.

*To all whom it may concern:*

Be it known that I, THEODORE D. WILLIAMS, of Rochester, in the county of Monroe and State of New York, have invented certain new and useful Improvements in Pay-Roll-Calculating Machines; and I do hereby declare the following to be a full, clear, and exact description of the same, reference being had to the accompanying drawings, forming a part of this specification, and to the reference-numerals marked thereon.

My present invention relates to calculating machines and it has for its object to provide a simple and efficient machine having a relatively small keyboard for automatically computing and registering payroll memoranda, that is, the number of pieces of money of each denomination that are required to provide the proper change for distributing the pay in such manner that the aggregate number of pieces of all the denominations for which the machine is adapted is as small as possible. A further object of the invention is to provide a machine that will indicate the number of pieces in each item of the payroll and also the total number for all items. Still another object is to combine a machine of this character with the ordinary adding or calculating machine so that as the payroll items are added on the last mentioned machine, the proper denominational divisions thereof will automatically and by the same operation be computed on the first mentioned machine. To these and other ends the invention resides in certain improvements and combinations of parts all as will be more fully described hereinafter, the novel features being pointed out in the claims at the end of the specification.

In the drawings:

Figure 1 is a top plan view of an adding machine combined with a payroll computing machine constructed in accordance with and illustrating one embodiment of my invention;

Fig. 2 is a diagrammatic view of the circuit arrangements of the device, and

Fig. 3 is a side elevation of one row or group of operating keys and two groups of register actuators with certain electrical circuits connecting them shown diagrammatically.

Fig. 4 is a side elevation of a row of actuators together with the mechanism by which they are connected up to a register;

Fig. 5 is a detail section taken substantially on the line 5—5 of Fig. 4;

Fig. 6 is a fragmentary view of a portion of the actuator mechanism of another group.

Similar reference numerals throughout the several figures indicate the same parts.

I will first describe the general construction and operation of my machine and explain the net results accomplished by it and later explain its detail. In this view, 1 indicates generally the usual or any preferred form of adding machine having a keyboard comprising nine rows of keys A, B, C, D, E, F, G, H and K with nine keys in each row numbered from one to nine, as shown. The row A is for the units column of an amount expression, B the tens column, C the hundreds column, and so on. The operation of such a machine is thought to be too well known to require description here beyond saying that the desired numbers in each column are selected by depressing the keys and the expression is registered at 2 and printed at 3 on a web 4 that issues from the machine, the printing and registering of each following actuation of the lever 5 and totals being registered in the same way by also depressing the key 6 before the lever 5 is pulled. The printed total is shown at 7.

In the practice of my invention, another calculating machine indicated generally at 8, of very much the same general nature, is detachably secured to the machine 1 by catches 9. It also has registers or accumulators *a, b, c, d, e, f, g, h* which, however, register numbers, separately read, that represent cents, nickels, dimes, etc. on the decimal system up to twenty dollar pieces, as indicated thereon. These registrations are also printed in similarly designated columns across a web 10 both in separate items, as shown at 11, or in a total, as shown at 12. Whenever an item is registered on the adding machine, the same actuation of the keys registers the fewest number of pieces of money that will go to make up that sum and indicates the denomination of each. Thus, the first item registered on the adding machine is $38.47 and the corresponding registration on the payroll web 10 shows one twenty dollar bill, one ten dollar bill, one five dollar bill, three one dollar bills, four dimes, one nickel and two cents. Running these down in the order named, it will be seen that no greater number of the larger denominations could be used to reduce the number of any smaller denomination required. The totals will similarly show that two twenties, two tens, three fives, eight ones, seven dimes, two nickels and seven pennies are required to make up eighty three dollars and eighty-seven cents with the proper change for the items that constitute it.

The registers or recorders of the payroll machine are, in the present instance, electrically actuated and automatically selected by contacts made with the keys of the adding machine. There are four actuators $a'$, $a^2$, $a^3$ and $a^4$ for the cents register $a$; one actuator $b'$ for the nickels register $b$; four actuators $c'$, $c^2$, $c^3$ and $c^4$ for the dimes register $c$; one actuator $d'$ for the half dollars register $d$; four actuators $e'$, $e^2$, $e^3$ and $e^4$ for the dollars register $e$; one actuator $f'$ for five dollars $f$; one actuator $g'$ for ten dollars $g$, and four actuators $h'$, $h^2$, $h^3$ and $h^4$ for the twenty dollars $h$. The actuators of each series are suitably arranged to respectively record 1, 2, 3 or 4 units on the corresponding register. More than four cents can be paid with a nickel; amounts containing more than one nickel can be paid with dimes; amounts containing more than four dimes can be paid with half dollars, and so on. Hence, not more than four actuators are required in any instance and in several instances only one is required.

The push rods or plungers that respectively turn the registers to a greater or less degree are indicated at 13 in Figs. 3 and 4. In Fig. 4 is shown the row of actuators $a'$, etc., with the mechanism through which they turn the register $a$, it being understood that there is a corresponding mechanism for each row of actuators. The plungers project through a platform 40 and springs 41 bear against this platform and against collars 42 on the plungers to return the latter after being depressed. Pivoted at 43 on an ear 44 on the platform is a segment lever 45 geared with a rotary member 46 turning freely on the shaft 47 of register $a$. The member 46 carries a pawl 48 coöperating with a ratchet wheel 49 on the first register wheel. As the lever 45 is rocked back and forth, the ratchet 48 turns the register wheel a given distance and then re-sets. The lever 45 is rocked by a draw bar 50 pivoted to its lower end at 51 and guided in a bracket 52 on the under side of platform 40. On shaft 53 of operating lever 5 is an arm 54 connected to the draw bar 50 by a spring 55. This spring normally holds a pin 56 on the draw bar against arm 54 and maintains the segment arm 45 and register $a$ in the normal position of Fig. 4. When the lever 5 is pulled forwardly, the arm 54 on its shaft 53 exerts a pull on the draw bar 50 through the medium of spring 55. But the draw bar is normally held against such movement by a latch 57 on a bell crank lever 58 pivoted to bracket 52 at 59. Pivoted to the bell crank 58 at 60 is a link 61 the other end of which link is pivoted at 62 to a second bell crank 63. The bell cranks are also connected by a bar 64 so that the link 61 has a parallel motion. The plungers 13 rest on the link 61 and when one of them is depressed, the link swings downwardly and disengages catch 57 from the draw bar 50. At the same time a stop 65 on the plunger is brought opposite a pin 66 on the draw bar. There is a pin and stop for each plunger, as shown, but in each instance, these two elements are separated to a different extent. Thus, when the crank lever 5 is drawn forward, the draw bar 50 is shifted to the extent permitted by the stop 65 on the particular plunger 13 that has been actuated and has displaced the latch 57 and hence the segment lever 45 shifts the register $a$ accordingly. If none of the plungers 13 of the row has been actuated, the bar 50, of course, remains locked and the pull of the arm 54 is taken up entirely by the spring 55.

The several wheels on the register $a$ operate each other to accumulate amounts in the usual manner.

In the case of a single actuator such as $b'$, $d'$ etc., the draw bar 50 shown in Fig. 6 is normally held locked, not by a latch 57 but by a shoulder 67 on the stop 65 with which shoulder the pin 66 is normally in contact. The plunger 13 does not rest on the draw bar and when it is actuated, the shoulder 67 is displaced from the pin 66 and the latter is brought in contact with the face of the stop 65 in the manner previously explained when the draw bar is shifted.

Each plunger is under the control of an arm 14 of a separate solenoid 15. The keys A, B etc. are fitted with insulated projections 16 that operate switches or circuit closers 17, 18, 19, 20, 21, 22, 23, 24, 25, 26, 27 28 and 29. Some of the keys are fitted with two switches for purposes that will hereinafter appear.

In Fig. 3 are shown in detail the row of units keys A capable of recording amounts up to nine cents the row of actuators $a'$, etc., for the cents register $a$ and the actuator $b'$ for the nickels register $b$, and the circuit arrangements will be explained with reference to this group of keys. If it is desired to record one cent, the first key of the group A is depressed. This closes a circuit from battery 30 through main circuit 31, switch 17, wire 32, solenoid $a'$, main wire 33 back to battery. The energized solenoid $a'$ draws down the arm 14 and depresses the plunger 13, actuating the register $a$ through one count. Similarly, keys 2, 3 and 4 for respectively recording two cents, three cents and four cents are connected to energize the solenoids $a'$, $a^2$, $a^3$ and $a^4$. When it comes to the fifth key for recording five cents a circuit is closed from battery 30, main line 31, switch 21, wire 34, wire 35, solenoid $b'$, main line 33 and back to battery. Thus, the actuating mechanism $b'$ of register $b$ causes the registering of one nickel. If the amount is more than five cents, say six cents, circuits will be established through both the solenoid $a'$ and the solenoid $b'$, as follows— battery 30, main line 31, switch 22, wire 36, wire 32, solenoid $a'$, main line 33 and back to battery 30, on the one hand, and battery 30, main wire 31, switch 23, wire 37, wire 35, solenoid $b'$, main line 33 and back to battery. The result will obviously be that actuator $a'$ being energized and actuator $b'$ also, both register $a'$ and register $b'$ will be moved one count and one nickel and one cent will be registered and printed on the payroll computer, making a total of six cents corresponding with the said sixth key of group A.

In the same way, key 7 is connected to actuator $b'$ and actuator $a^2$; key 8 to actuator $b'$ and actuator $a^3$, and key 9 to actuator $b'$ and actuator $a^4$. On Fig. 2, these circuit arrangements may be traced with respect to all keys in groups A, B, C and D, but it is not believed necessary to describe in detail the operation of the groups B, C and D as they are on exactly the same scheme as group A and it would needlessly complicate the showing to complete the circuit arrangements of the remaining groups. Keys 1 to 4 of group B are connected, respectively, to actuators $c'$, $c^2$, $c^3$, $c^4$, for instance, while key 5 of the same group is connected to actuator $d'$ and the remaining keys 6, 7, 8 and 9 are respectively connected both to actuator $d'$ and actuators $c'$, $c^2$, $c^3$ and $c^4$.

In order to make a unit of the payroll computer 8, it is detachably secured to the adding machine 1 by the catches 9, as before described, and the electrical connections are established in the present instance through the provision of plugs 38 on one machine and sockets 39 on the other, as shown in Figs. 1 and 2.

It will be observed that my payroll computer utilizes the simple keyboard of the adding machine and that it does its work in conjunction with the adding machine without interfering with the latter in any way and no mental processes whatever beyond those indulged in in operating an adding machine are required in connection with the computer. Furthermore, it is obvious that the computer may be used separately from the adding machine, in which phase of the invention the keyboard shown may be considered with respect to its circuit closing functions alone.

I claim as my invention:

1. The combination with an adding machine having a plurality of groups of keys or operating members corresponding to the different columns of numbers in an amount expression, and corresponding registers for said keys, of a payroll calculator comprising a plurality of registers adapted to indicate numbers of pieces of money of different denominations of the decimal system, and a plurality of electrically controlled actuators for the respective registers, and a plurality of electrical circuits including the said actuators and in which the keys of the adding machine form switches, different individual keys in any one group being arranged to control the circuit of an actuator for a larger denomination register, and the circuit of an actuator of a small and that of a large denomination register.

2. The combination with an adding machine having a plurality of groups of keys or operating members corresponding to the different columns of numbers in an amount expression, and corresponding registers for said keys, of a payroll calculator detachably secured to the adding machine and comprising a plurality of registers adapted to record numbers of pieces of money of different denominations of the decimal system, and a plurality of electrically controlled actuators for the respective registers, and a plurality of electrical circuits including the said actuators and in which the keys of the adding machine form switches, different individual keys in any one group being arranged to control the circuit of an actuator for a small denomination register; the circuit of an actuator for a larger denomination register, and the circuit of an actuator of a small and that of a large denomination register, the said circuits including contacts on the adding machine and payroll calculator, respectively, that coöperate when said parts are secured together and which are disconnected when the payroll calculator is detached.

THEODORE D. WILLIAMS.

Witnesses:
RUSSELL B. GRIFFITH,
AGNES NESBITT BISSELL.